(12) United States Patent
Sorenson, Jr. et al.

(10) Patent No.: US 7,138,059 B2
(45) Date of Patent: Nov. 21, 2006

(54) ENVIRONMENTAL BIOREMEDIATION USING SHELL AS AN ELECTRON DONOR

(76) Inventors: Kent S. Sorenson, Jr., 2785 Eagle Dr., #B205, Idaho Falls, ID (US) 83406; Donovan N. Smith, III, 6430 N. Nevada Ave., Parkville, MO (US) 64152; Wayne H. Wilke, 16207 Dearborn, Stilwell, KS (US) 66085

( * ) Notice: Subject to any disclaimer, the term of this patent is extended or adjusted under 35 U.S.C. 154(b) by 0 days.

(21) Appl. No.: 10/409,635

(22) Filed: Apr. 7, 2003

(65) Prior Publication Data

US 2004/0195176 A1 Oct. 7, 2004

(51) Int. Cl.
*C02F 3/00* (2006.01)

(52) U.S. Cl. .............. 210/610; 210/909; 210/912; 210/913; 210/914; 210/757; 210/611

(58) Field of Classification Search .......... 210/610, 210/909, 912–914, 757, 611
See application file for complete search history.

(56) References Cited

U.S. PATENT DOCUMENTS

| | | | | |
|---|---|---|---|---|
| 4,293,098 A | * | 10/1981 | Muralidhara | 241/9 |
| 5,312,908 A | * | 5/1994 | Nakao | 536/20 |
| 5,888,021 A | * | 3/1999 | Kawabata | 166/246 |
| 6,264,841 B1 | * | 7/2001 | Tudor | 210/688 |
| 6,589,776 B1 | | 7/2003 | Harkness | |
| 6,620,611 B1 | * | 9/2003 | Hince | 435/262.5 |
| 6,623,211 B1 | * | 9/2003 | Kukor et al. | 405/128.75 |
| 6,632,941 B1 | * | 10/2003 | Wooten et al. | 536/127 |
| 6,806,078 B1 | * | 10/2004 | Newman | 435/262.5 |

OTHER PUBLICATIONS

CHITOREM SC80 product brochure, published in Feb. 2003, downloaded from http://www.jrwbioremediation.com/PDF/ChitoRem%20Spec.pdf on Nov. 1, 2005.*
Harkness, et al., "The Case for Chitin" (Nov. 2003).*
Response (Mar. 24, 2005) to Nov. 23, 2004, office action in U.S. trademark registration application 78/245777 filed May 5, 2003, for CHITOREM mark, including specimen showing use of the mark in conjunction with product designation "SC20".*
U.S. Appl. No. 60/459,811, filed Apr. 1, 2003, at p. 8.*
Paper A-34 in V.S. Magar and M.E. Kelley (Eds.), In Situ and On Site Bioremediation—2003, Proceedings of the Seventh International In Situ and On-Site Bioremediation Symposium (Orlando, FL; Jun. 2003). ISBN 1-57477-139-6, published by Battelle Press.*

(Continued)

*Primary Examiner*—Chester T. Barry
(74) *Attorney, Agent, or Firm*—Clayton, Howarth & Cannon, P.C.

(57) ABSTRACT

A method for in situ bioremediation of contaminants in the environment is described. The method includes adding an electron donor to ground water in an amount sufficient for a microbe in the ground water to use the electron donor for reducing the contaminant into an innocuous derivative thereof. Illustratively, the electron donor contains about 0.1 to 75% by weight of chitin, such as crustacean shell, partially deproteinized crustacean shell, ground mushrooms, or a fungal fermentation broth. The chitinous electron donor can be added to the ground water as a particulate solid or aqueous slurry.

40 Claims, 8 Drawing Sheets

OTHER PUBLICATIONS

"JRWBioremediation, LLC—CHITOREM™ Chitin Complex," downloaded from http:/www.jrwbioremediation.com/ChitoRem.htm on Nov. 4, 2005 listing product grades, SC20, SC40, and SC80.*

"Proposed Remedial Action Plan—GE Main Plant—Supporting Information" (undated), downloaded from http://www.dec.state.ny.us/website/der/projects/gemain/bioremediation.pdf on Nov. 9, 2005.* http://www.dec.state.ny.us/website/der/projects/gemain/ downloaded Nov. 9, 2005.*

* cited by examiner

ENVIRONMENTAL BIOREMEDIATION USING SHELL AS AN ELECTRON DONOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to bioremediation of contaminants in the environment. More particularly, this invention relates to crustacean shell and other chitin-containing products as electron donors for environmental bioremediation of contaminants, such as halogenated straight-chain and aromatic hydrocarbons, explosives such as aromatic nitrates, perchlorates, other halogenated organic compounds, and certain metals.

Chlorinated solvents are the most common class of ground water contaminants at hazardous waste sites in the United States. In a list of the top 25 most frequently detected contaminants at such sites, the Agency for Toxic Substances and Disease Registry (ATSDR) found that ten of the top twenty were chlorinated solvents or their degradation products, including two of the top three. National Research Council, Alternatives for Ground Water Cleanup (National Academy Press, Washington, D.C. 1994). In fact, the same survey found that the most common contaminant, trichloroethylene (TCE), is present in more than 40% of the National Priority List sites. Worse yet, remediation of ground water contaminated by these compounds often presents unique obstacles related to their inherent characteristics, including hydrophobicity and high density. Recent advances in the understanding of biodegradation processes involving chlorinated solvents permit remediation of residual contamination source areas in low permeability, saturated or variably saturated soils at a much lower cost than conventional methods.

Metals, perchlorates, explosives, and other contaminants also appear on lists of contaminants frequently detected at hazardous waste sites. These contaminants also present challenges to cleaning up such sites.

Chitin, a condensation polymer of N-acetyl-D-glucosamine, is the structural component of the shells of crustaceans and other arthropods. Chitin is also present in many other organisms, such as fungi and yeasts. Because it is present in so many different types of organisms, chitin is the most plentiful natural polymer next to cellulose.

In arthropods, the intersegmental membranes are flexible chitinous structures. The cuticular sclerites also have the same characteristics just after molting. The bulk of the procuticle is a chitin and protein complex. The innermost layer of the calcified cuticle of crustacea is not calcified, but lies between the calcified procuticle and the epidermis, which has characteristics similar to those of the intersegmental membrane. The sclerites of crustaceans can be interpreted as intersegmental membranes whose procuticle is almost entirely calcified with calcium carbonate and, to a lesser degree, calcium phosphate. Calcium carbonate occurs as micro- or macro-crystals of calcite. The hardening of calcified cuticles is, however, initiated by protein sclerotization prior to deposition of calcium salts. The amount of protein in the calcified cuticle is much lower than in the flexible procuticle or in the sclerotized exocuticle of insects, as a result of the calcification.

In fungi, such as *Mortierella vinacea, Mucor rouxii, Phycomyces blakesleeanus*, and *Cunninghamella elegans*, chitin synthetase activity is associated with the cell wall fraction. In other organisms, however, the enzyme was found to be located mainly in the mitochondrial and microsomal fractions. The difficulty of removing chitin synthetase from the cell wall fractions of *Mortierella vinacea* or *Mucor rouxii* suggests that the enzyme is bound to the cell wall. In the yeast, *Saccharomyces cerevisiae*, chitin is found in the primary septum of the cell wall, which occurs at bud scars.

Chitin refers to a polymer of N-acetylglucosamine where a minority of the acetyl groups has been lost, while the term chitosan refers to a deacetylation product obtained from chitin, where most of the acetyl groups have been removed. Experimentally, chitosan can be distinguished from chitin because of its solubility in dilute acetic or formic acid. Chitin is also a product that contains less than 7% nitrogen, while chitosan contains 7% or more nitrogen. The amino groups of chitin and chitosan are exceptionally stable in 50% sodium hydroxide, even at high temperature. Glucosamine occurs as an essential part of the polymer structure. Elemental analysis of chitin samples reveal that they bind water tenaciously. This is consistent with the general picture of chitin structure as a chain of N-acetylglucosamine punctuated by free glucosamine units with considerable amounts of trapped water as part of the molecule.

Chitin and chitosan are both biodegradable and non-toxic, and they have binding properties such that they function as excellent flocculants for clarifying liquids, help heal wounds, can be fabricated into strong permeable films, and function as drug-delivery gels for topical application of a variety of medicaments. It has also been determined that chitin may be used as an electron donor in bioremediation of contaminants in the environment.

Chitin and chitosan are generally refined from the waste products of the crab and shrimp industries, but can also be produced from the processing wastes of shellfish, krill, clams, oysters, and fungi. The crustacean shells are treated with a caustic wash (i.e., strong base, such as sodium hydroxide) to remove protein and other contaminants attached to the shells. The resulting intermediate, which is primarily composed of chitin, mineral complexes (primarily calcium carbonates), and water, is then washed with water to remove residual base. Next, the deproteinized intermediate is treated with strong acid, such as hydrochloric acid, for dissolving and removing the minerals. After the minerals are washed away, the product is dried and may be ground and screened for size. Riccardo A. A. Muzzarelli, Chitin (Pergamon 1977). The resulting refined, "pure" chitin typically contains greater than 94.4% chitin, 1.5% ash, and 3% caustic solubles on a dry weight basis. The biggest deficiency of such a chitin product for environmental bioremediation is the high cost of the chitin in quantities sufficient for use in the field.

While prior art methods of using chitin as an electron donor for bioremediation applications are known and are generally suitable for their limited purposes, they possess certain inherent deficiencies, such as high cost and low efficiency, that detract from their overall utility in environmental bioremediation.

In view of the foregoing, it will be appreciated that providing high-efficiency methods for carrying out bioremediation of hazardous waste sites using low-cost, chitin-containing materials would be a significant advancement in the art.

BRIEF SUMMARY OF THE INVENTION

It is a feature of the present invention to provide low-cost, high efficiency methods for carrying out bioremediation of hazardous waste sites.

It is another feature of the invention to provide methods of using low-cost chitin-containing products as electron donors for environmental bioremediation.

These and other features can be addressed by providing a method for in situ bioremediation of a contaminant in ground water comprising adding to the ground water an electron donor in an amount sufficient for a microbe in the ground water to use the electron donor for reducing the contaminant into an innocuous derivative thereof, wherein the electron donor comprises a composition comprising about 0.1 to 75% by weight of chitin. Illustratively, the composition can comprise about 0.5 to 65% by weight of chitin or even about 2 to 50% by weight of chitin. In one illustrative embodiment of the invention, the composition comprises crustacean shell or partially deproteinized crustacean shell. For example, the composition can comprise a mixture (i.e., SC20) comprising about 10 to 30% by weight of chitin, about 5–50% by weight protein, about 20–60% by weight calcium carbonate, and about 10–20% by weight of water. By way of further example, the composition can comprise a mixture (i.e., SC40) comprising about 30–50% by weight of chitin, about 1 to 5% by weight of protein, about 40–70% by weight of calcium carbonate, and about 10 to 20% by weight of water.

Chitinous compositions can also be used in the form of ground mushrooms or fungal fermentation broth.

The chitinous composition can be added to the ground water as a particulate solid. The chitinous composition can also be added to the ground water as a slurry or aqueous suspension. Under such circumstances, the slurry or aqueous suspension should comprise at least about 100 milligrams per liter of chitin.

The microbe can be naturally present in the ground water or can be added to the ground water before, during, or after addition of the chitin-containing composition.

Another illustrative method according to the present invention comprises a method for in situ bioremediation of a nonaqueous halogenated solvent in ground water comprising adding to the ground water an amount of an electron donor sufficient for a halo-respiring microbe in the ground water to use the nonaqueous halogenated solvent as an electron acceptor, thereby reductively dehalogenating the nonaqueous halogenated solvent into innocuous compounds, wherein the electron donor comprises a composition comprising about 0.1 to 75% by weight of chitin.

Another illustrative method for in situ bioremediation of a contaminant in ground water according to the present invention comprises adding to the ground water an electron donor in an amount sufficient for a microbe in the ground water to use the electron donor for reducing the contaminant into an innocuous derivative thereof, wherein the electron donor comprises a mixture comprising about 10 to 30% by weight of chitin, about 5–50% by weight protein, about 20–60% by weight calcium carbonate, and about 10–20% by weight of water.

Still another illustrative method for in situ bioremediation of a contaminant in ground water according to the present invention comprises adding to the ground water an electron donor in an amount sufficient for a microbe in the ground water to use the electron donor for reducing the contaminant into an innocuous derivative thereof, wherein said electron donor comprises a composition of matter comprising a mixture comprising about 30–50% by weight of chitin, about 1 to 5% by weight of protein, about 40–70% by weight of calcium carbonate, and about 10 to 20% by weight of water.

DETAILED DESCRIPTION

Figure 1:
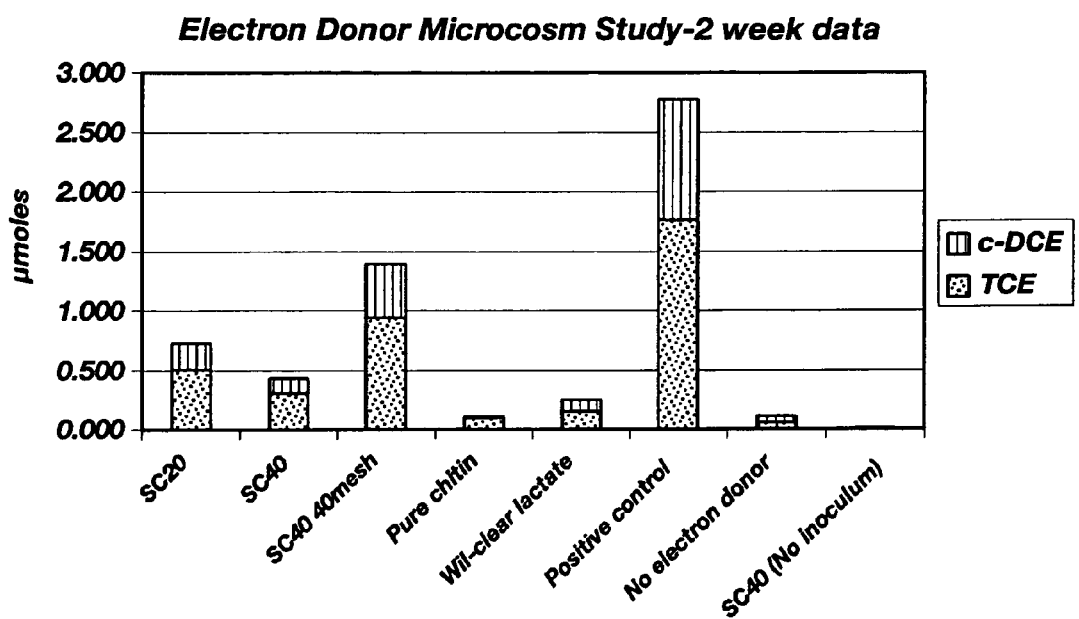
FIG. 1 shows micromolar amounts of dechlorination products produced in the microcosms of Example 3 after two weeks of incubation.

Before the present methods for performing bioremediation using low-cost chitin-containing materials are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of." As used herein, "consisting of" and grammatical equivalents thereof exclude any element, step, or ingredient not specified in the claim.

As used herein, "consisting essentially of" and grammatical equivalents thereof limit the scope of a claim to the specified materials or steps and those that do not materially affect the basic and novel characteristic or characteristics of the claimed invention.

As used herein, "PCE," "perchloroethylene," "tetrachloroethylene," and "tetrachloroethene" refer to $Cl_2C=CCl_2$.

As used herein, "TCE," "trichloroethylene," and "trichloroethene" refer to $Cl_2C=CH-Cl$.

As used herein, "c-DCE," "cis-DCE," "t-DCE," "trans-DCE," "DCE," "dichloroethylene," and "dichloroethene" refer to $Cl-HC=CH-Cl$, and "1,1 -DCE" refers to $Cl_2CH=CH_2$.

As used herein, "VC" and "vinyl chloride" refer to $H_2C=CH-Cl$.

As used herein, "ethylene" and "ethene" refer to $H_2C=CH_2$.

As used herein, "chloroethenes" or "chlorinated ethenes" means PCE, TCE, DCE, VC, and mixtures thereof; "chloroethanes" or "chlorinated ethanes" means TCA, DCA, CA, and mixtures thereof, "chloromethanes" or "chlorinated methanes" means CT, CF, DCM, MC, and mixtures thereof.

As used herein, an "innocuous derivative" of a contaminant is a derivative that is not considered hazardous in the environment. For example, complete anaerobic reductive dechlorination of chlorinated ethenes results in ethene, ethane, carbon dioxide, water, halogen salts, and mixtures thereof, which is not considered hazardous.

As used herein, a "fungal fermentation broth" is a liquid nutrient medium in which chitin-producing fungi are grown, and includes the fungi.

Anaerobic bioremediation of halogenated solvents is a fundamentally different process than aerobic bioremediation. Under appropriate anaerobic conditions, chlorinated solvents can be used directly by some microorganisms as electron acceptors through a process that has come to be known as "chlororespiration," or, more generally, "halorespiration." D. L. Freedman & J. M. Gossett, Biological Reductive Dechlorination of Tetrachloroethylene and Trichloroethylene to Ethylene Under Methanogenic Conditions, 55 Applied Environ. Microbiol. 2144–2155 (1989), first published the complete degradation pathway for chlorinated ethenes to ethene. In the following years, several publications reported evidence that the degradation could be achieved through microbial respiration, indicating that the microorganisms could actually grow by using chlorinated solvents directly as electron acceptors. The primary requirement to facilitate this process is the addition of a suitable electron donor or carbon source. Many electron donors have been described in the literature, including acetate, lactate, propionate, butyrate, formate, ethanol, hydrogen, and many others. U.S. Pat. No. 5,277,815 issued in 1994 for in situ electron donor addition along with control of redox conditions to effect the desired end products. U.S. Pat. No. 5,578,210 issued later for enhanced anaerobic in situ bioremediation using "biotransformation enhancing agents," i.e., electron donors such as propylene glycol, glycerol, glutamate, a mixture of proteose peptone, beef extract, yeast extract, malt extract, dextrose, and ascorbic acid, and mixtures thereof. Based primarily on what was publicly available in the scientific literature, studies of enhanced anaerobic in situ bioremediation of chlorinated solvents began in the mid-1990s. This approach generally includes electron donor addition, sometimes with other micronutrients, to facilitate biotransformation of aqueous-phase contaminants. To date, only a few large-scale studies have been published in the peer-reviewed literature, but environmental consulting companies and remediation contractors are increasingly using the general approach.

P. V. Roberts et al., Field Study of Organic Water Quality Changes during Ground Water Recharge in the Palo Alto Baylands, 16 Water Resources Research 1025–1035 (1982), reported one of the first field observations suggesting bioremediation of chloroethenes (PCE, TCE, DCE, and VC). E. J. Bouwer & P. L. McCarty, Transformation of 1- and 2-Carbon Halogenated Aliphatic Organic Compounds under Methanogenic Conditions, 45 Applied Environ. Microbiol. 1286–1294 (1983), confirmed biodegradation of PCE and TCE in the laboratory shortly thereafter. F. Parsons et al., Transformations of Tetrachloroethylene and Trichloroethylene in Microcosms and Groundwater, 76 J. Am. Water Works Ass'n 56–59 (1984), and T. M. Vogel & P. L. McCarty, Biotransformation of Tetrachloroethylene to Trichloroethylene, Dichloroethylene, Vinyl Chloride, and Carbon Dioxide under Methanogenic Conditions, 49 Applied Environ. Microbiol. 1080–1083 (1985), demonstrated that DCE and VC were generated during biodegradation of PCE under anaerobic conditions. Finally, Freedman and Gossett, supra, reported complete dechlorination of PCE to ethylene as follows: PCE→TCE→DCE→VC→ethylene. In each step of the process the compound was reduced (gaining two electrons) through substitution of a chlorine atom by a hydrogen atom. Hence this degradation pathway is often referred to as reductive dechlorination or anaerobic reductive dechlorination.

In the reductive dechlorination process, chloroethenes act as electron acceptors. This implies that the process can be limited in the field by the availability of sufficient suitable electron donors. In fact, reductive dechlorination also can be totally or partially inhibited by the presence of competing inorganic electron acceptors, such as oxygen, nitrate, iron, and sulfate. It is now widely accepted that reductive dechlorination occurs to some extent at most field sites where chloroethene contamination exists in the presence of a sufficient supply of electron donors. P. L. McCarty, Biotic and Abiotic Transformations of Chlorinated Solvents in Groundwater, in Symposium on Natural Attenuation of Chlorinated Organics in Ground Water 5–9 (Office of Research and Development, U.S. Environmental Protection Agency, Washington, D.C., EPA/540/R-96/509, 1996); J. M. Gossett & S. H. Zinder, Microbiological Aspects Relevant to Natural Attenuation of Chlorinated Ethenes, in Symposium on Natural Attenuation of Chlorinated Organics in Ground Water 10–13 (Office of Research and Development, U.S. Environmental Protection Agency, Washington, D.C., EPA/540/R-96/509, 1996); T. H. Wiedemeier et al., Technical Protocol for Evaluating Natural Attenuation of Chlorinated Solvents in Groundwater, Draft—Revision 1 (Air Force Center for Environmental Excellence, Technology Transfer Division, Brooks Air Force Base, San Antonio, Tex., 1997).

Many oxidizable organic compounds potentially could make suitable electron donors. For a potential electron donor to be useful as an amendment for enhanced in situ bioremediation, however, it must be safe to use, facilitate the desired reaction, and be relatively inexpensive.

In recent years, interest has grown in using slow release electron donors in enhanced bioremediation systems for treating chlorinated solvents and other contaminants in groundwater. Slow release electron donors keep hydrogen levels low enough that dechlorinating bacteria use a greater percentage of the amendment than with the more readily available electron donors. If hydrogen levels become too high, then methanogens dominate the system use a large amount of the amendment. This interest in slow release electron donors is largely derived from the simplicity and low maintenance requirements of slow release systems relative to conventional systems that use continuous or semi-continuous addition of soluble electron donors, such as lactate or molasses. The costs of the electron donor, however, can be a significant fraction of total process costs for slow release systems, making the selection of an efficient and low cost electron donor very important to the efficacy and overall economics of these systems. Chitin holds great promise in this regard due to its commercial availability and efficiency for promoting bioremediation of hazardous materials.

Chitin is highly biodegradable and breaks down into simple organic acids such as acetate, propionate, butyrate, pyruvate, and others. Chitin contains about 6–7% nitrogen, which provides a carbon:nitrogen ratio ideally suited for supporting bacterial growth. In addition, as a porous solid, chitin provides both a support for bacterial colonization and a long-term source of carbon and, ultimately, hydrogen that can be utilized by halorespiring bacteria. Therefore, chitin has the potential to fill an important niche as a low-cost slow-release source of hydrogen in bioremediation applications for chlorinated aliphatics and other contaminants.

In its natural form, crustacean shell typically contains about 40–50% calcium carbonate, 30–40% protein, and 15–20% chitin. For most applications, the protein and calcium carbonate are removed from the chitin via processing with strong bases and acids, respectively, such that refined chitin is typically sold for $9.00–11.00/kg ($4.00–5.00/lb). It would be advantageous, however, if lower cost electron donors could be identified for use in bioremediation applications.

There is now considerable interest in using slow release electron donors in place of conventional enhanced bioremediation systems that utilize soluble electron donors such as lactate or molasses. As demonstrated in M. R. Harkness, Economic Considerations in Enhanced Anaerobic Biodegradation, in G. B. Wickramananyake, A. R. Gavaskar, B. C. Alleman, V. S. Magar, Bioremediation and Phytoremediation of Chlorinated and Recalcitrant Compounds 9–14 (Battelle Press, Columbus, Ohio 2000), the material cost of the electron donor has a significant impact on the economics of bioremediation applications using slow release donors. In conventional systems the majority of the total system cost is associated with labor and engineering of the donor delivery system. The material cost of the donor itself typically accounts for less than 10–15% of the system cost. This is not the case for slow release systems, where labor and engineering costs are substantially reduced due to the one-time emplacement of the donor. In these systems, material costs will dominate in any system where the donor cost is much more than $3.30/kg ($1.50/lb).

Inexpensive natural materials has been tested for use as slow release electron donors. C. E. Aziz, M. M. Hampton, M. Schipper, & P. Haas, Organic Mulch Biowall Treatment of Chlorinated Solvent-Impacted Groundwater, in A. Leeson, B. C. Alleman, P. J. Alvarez, & V. S. Magar, Bioaugmentation, Biobarriers, and Biogeochemistry 73–78 (Battelle Press, Columbus, Ohio 2001), tested bark mulch as biobarriers in field studies for the reductive dehalogenation of chlorinated solvents. In addition, C. M. Kao, S. C. Chen, & J. K. Liu, Development of a Biobarrier for the Remediation of a PCE-Contaminated Aquifer, 43 Chemosphere 1071–1078 (2001), and S. M. Vera, C. J. Werth, & R. A. Sanford, Evaluation of Different Polymer Organic Materials for Creating Conditions that Favor Reductive Processes in Groundwater, 5 Bioremediation Journal 169–181 (2001), tested peat and other cellulose-derived materials such as corn-crop residue and wood shavings have been examined for their ability to promote reductive dehalogenation in laboratory studies. These tests were all successful to some degree. However, all donors are not equivalent in their ability to provide consistent levels of utilizable hydrogen capable of sustaining dehalogenation over the long term. For example, chitin was a much superior donor relative to cellulose-derived analogs when compared head-to-head in dehalogenation tests. Vera et al., supra.

The present invention relates to use of chitin-containing complexes that, in addition to chitin, contain protein and minerals. These complexes are easier to produce and significantly less expensive than pure chitin. A surprising and unexpected finding of experiments with these chitin-containing complexes is that they are superior to pure chitin as electron donors for anaerobic reductive dehalogenation of halogenated hydrocarbons and bioremediation of other contaminants.

Contaminants that can be remedied in the environment according to the present invention include halogenated hydrocarbons, such as chlorinated ethenes, chlorinated ethanes, chlorinated methanes, longer straight-chain chlorinated hydrocarbons of any saturation, chlorinated aromatics, and the like, and mixtures thereof; explosives, such as TNT, RDX, and aromatic nitrates; perchlorates; other halogenated organic compounds; and certain metals that form insoluble precipitates.

In the case of metals that form insoluble precipitates, both pH and, in some cases, the presence of sulfur (elemental sulfur, sulfite, sulfide, HS, or sulfate) are required for precipitation. Electron donors such as chitin and lactate set up strong enough reducing conditions that sulfate-reducing bacteria will produce sulfide in a sulfur-containing aquifer. Contaminants that are immobilized by reduction without sulfide being present include: at pH less than 3—copper, molybdenum, and uranium; at pH 3 to 6.5—copper, molybdenum, and uranium; at pH 6.5 to 8.5—copper, molybdenum, uranium, chromium, selenium, and vanadium; at a pH greater than 8.5—copper, molybdenum, uranium, chromium, selenium, vanadium, arsenic, and silver. A. I. Perel'man, Geochemical Barriers: Theory and Practical Applications, 1 Appl. Geochem. 669–680 (1986). Contaminants that are immobilized with sulfide include: at a pH less than 3—copper, molybdenum, uranium, antimony, arsenic, cadmium, lead, mercury, thallium, and tin; at pH 3 to 6.5—copper, molybdenum, uranium, cadmium, lead, mercury, thallium, tin, chromium, cobalt, iron, manganese, nickel, and zinc; at pH 6.5 to 8.5—copper, molybdenum, uranium, chromium, selenium, vanadium, cadmium, mercury, thallium, cobalt, iron, nickel, and zinc; at a pH greater than 8.5—copper, molybdenum, uranium, chromium, vanadium, arsenic, silver, cadmium, mercury, thallium, cobalt, iron, nickel, and iron.

The chitin-containing crustacean shell, partially deproteinized crustacean shell, fungal fermentation broth, or the like is added to the ground water according to methods well known in the art. For example, the chitin-containing material can be pumped, injected, or otherwise delivered through a well that reaches into the ground water to be treated.

EXAMPLE 1

This example relates to a chitin-containing complex referred to as ChitoRem™ SC20 (hereinafter, "SC20;" JRW Technologies, Inc., Lenexa, Kans.). The starting material for making SC20 was the crab shells left over after crab meat has been manually removed from crabs. The crab meat was used for human consumption. The crab shells after manual removal of crab meat still contained a significant amount of meat residue that adhered to the crab shells per se. The meat residue principally comprised protein, but also included lipids and other constituents.

After manual removal of meat from the crab shells, the remaining crab shell material was dried and ground into small pieces. Optionally, the ground crab shells can be screened for size. Screening for size can be carried according to procedures well known in the art, such as passing the dried and ground shell material through a screen having a selected mesh size such that pieces smaller than the openings in the screen pass through, and pieces larger than the openings in the screen are retained. The product resulting after drying, grinding, and, optionally size screening of the crab shells is termed SC20.

SC20 contains three predominant components, chitin, protein, and minerals. The mineral component of SC20 comprises calcium carbonate, as well as a variety of other minerals and trace nutrients.

EXAMPLE 2

This example relates to a chitin-containing complex referred to as ChitoRem™ SC40 (hereinafter, "SC40;" JRW Technologies, Inc.). As with the making of SC20 as described in Example 1, the starting material for making SC40 was the crab shells left over after crab meat had been manually removed from crabs. After manual removal of meat from the crab shells, the remaining crab shell material, comprising residual protein, chitin, and minerals, was subjected to a caustic (strong base) wash for removing some, but not all, of the protein adhering to the hard shells. After the caustic wash, the remaining shell material comprising chitin, minerals, and some residual protein was dried and ground into small pieces. Optionally, the ground, caustic-washed crab shells can be screened for size, as described in Example 1. The product resulting after partial removal of protein in a caustic wash, drying, grinding, and, optionally size screening of the crab shells is termed SC40.

SC40 contains three predominant components, chitin, protein, and minerals. The mineral component of SC20 comprises calcium carbonate, as well as a variety of other minerals and trace nutrients. Due to the partial removal of protein with the caustic wash, the amount of protein in SC40 is less than that in SC20.

EXAMPLE 3

Chitin-containing materials were evaluated for their efficacy in promoting the complete anaerobic dechlorination of tetrachloroethene (perchloroethylene or PCE) to ethene. As a comparison, pure chitin, which has been previously shown to support chloridogenesis, was also used. Additional products evaluated included Wilclear™ lactate (JRW Technologies, Inc.), LactOil™ lactated ester (JRW Technologies, Inc.), and sodium dipropionate (SDP). Microcosms were used with a mixed inoculum of PCE dechlorinating bacteria and were monitored at two-week intervals over a six-week period. PCE, TCE, and c-DCE were quantified at two, four, and six weeks. At six weeks, vinyl chloride, ethene, and methane concentrations were also measured. To determine the extent of electron donor degradation, the concentration of predominant volatile fatty acids was determined for each type of electron donor used. The pH was also measured at six weeks.

Microcosms comprised 100 ml of anaerobic culture medium (pH 7.2) placed in 160-ml serum bottles. Bottles were sealed with a TEFLON-lined butyl rubber septum. All microcosms were prepared in triplicate except for negative controls (no donor and no inoculum), which were duplicated. The general set-up of the experiment is shown in Table 1. Only the positive control received a supplemental vitamin solution, since this is how the cultures are routinely maintained.

TABLE 1

| Electron donor | Mass added | Limestone | NH$_4$Cl | Inoculum[d] | Vitamins | PCE (μmol) |
|---|---|---|---|---|---|---|
| SC20 | 1.0 g | 0.5 g | 0 | 1.5 ml | 0 | 19.54 |
| SC40 | 1.0 g | 0.5 g | 0 | 1.5 ml | 0 | 19.54 |
| SC40/40[a] | 1.0 g | 0.5 g | 0 | 1.5 ml | 0 | 19.54 |
| Chitin | 1.0 g | 0.5 g | 0 | 1.5 ml | 0 | 19.54 |
| Wilclear | 1 ml | 0.5 g | 4 mM | 1.5 ml | 0 | 19.54 |
| LactOil | 1 ml | 0.5 g | 4 mM | 1.5 ml | 0 | 19.54 |
| SDP | 0.3 ml | 0.5 g | 4 mM | 1.5 ml | 0 | 19.54 |
| Positive control | 2 & 4 mM[b] | 0.5 g | 4 mM | 1.5 ml | 1% | 19.54 |
| No donor | 0 | 0.5 g | 4 mM | 1.5 ml | 0 | 19.54 |
| No inoculum | 1.0 g | 0.5 g | 4 mM | 0 | 0 | 19.54 |

[a]SC40/40 is SC40 that was ground to approximately 40 mesh.
[b]Positive control received 2 mM lactate and 4 mM formate.
[c]Inoculum comprised 0.5 ml of each of three different enrichment cultures shown to dechlorinate PCE to ethene.

The inoculum used in these microcosm studies was derived from three enrichment cultures that had been shown to dechlorinate PCE to ethene on a mixture of formate, lactate, and yeast extract. Enrichment Well 20-B was derived from a contaminated well sediment sample. The Spot2-B and 9-B-1 enrichments were derived from river sediment samples. No residual sediment was present in the enrichment cultures.

PCE, TCE, and DCE were quantified using a gas chromatograph (GC) equipped with an ECD detector. Vinyl chloride, ethene, and methane were measured with a GC with an FID detector.

Figure 2A:
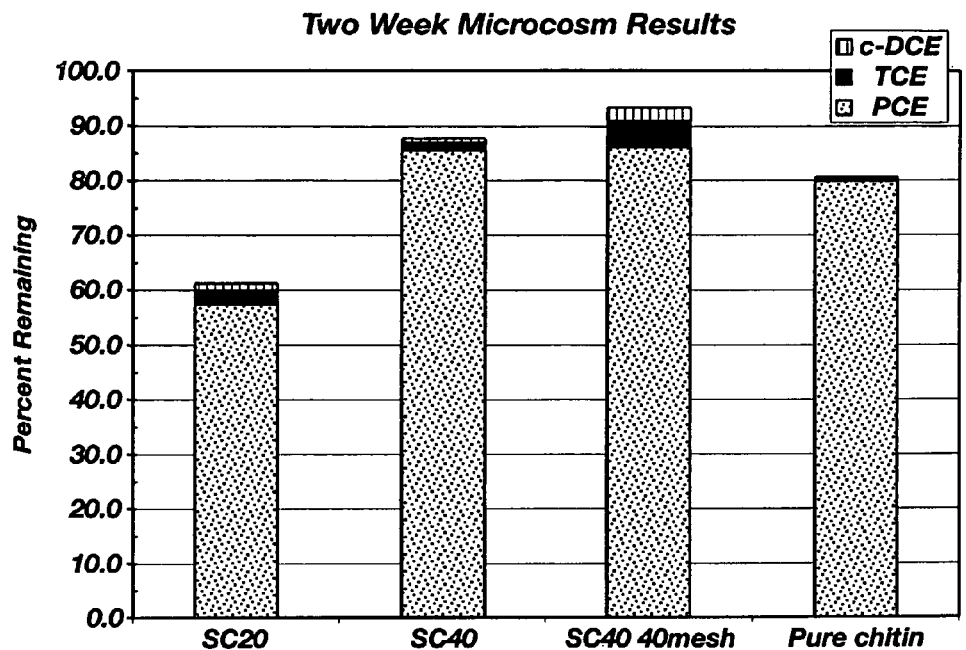
FIGS. 2A–B show approximate mass balances of chloroethenes in the microcosms of Example 3 after two weeks of incubation.
Figure 2B:
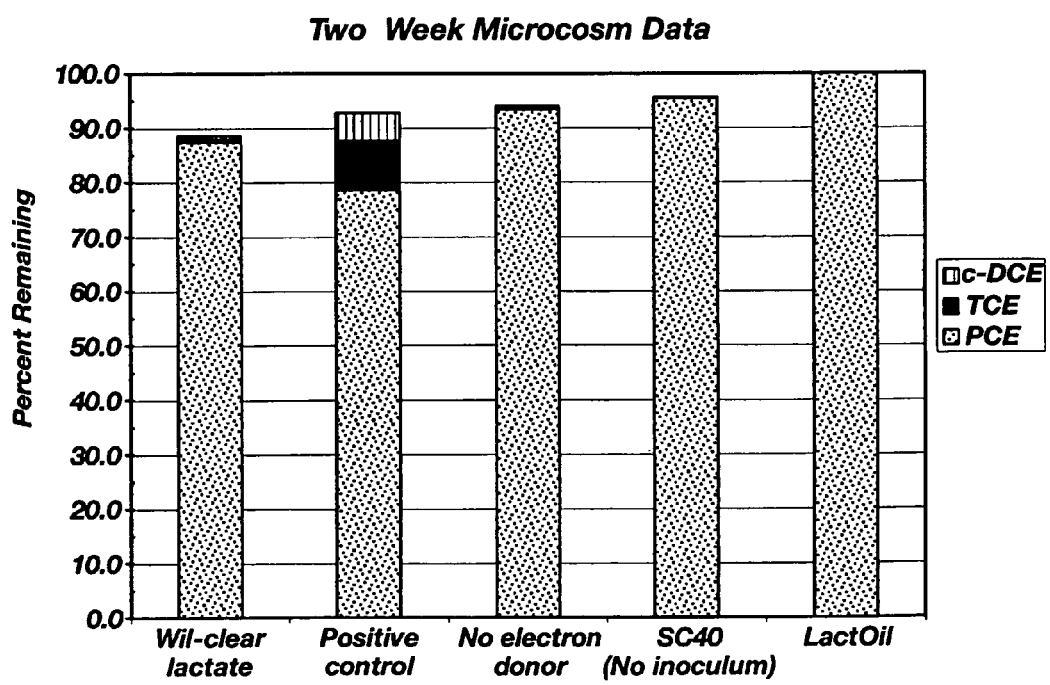
Figure 3A:
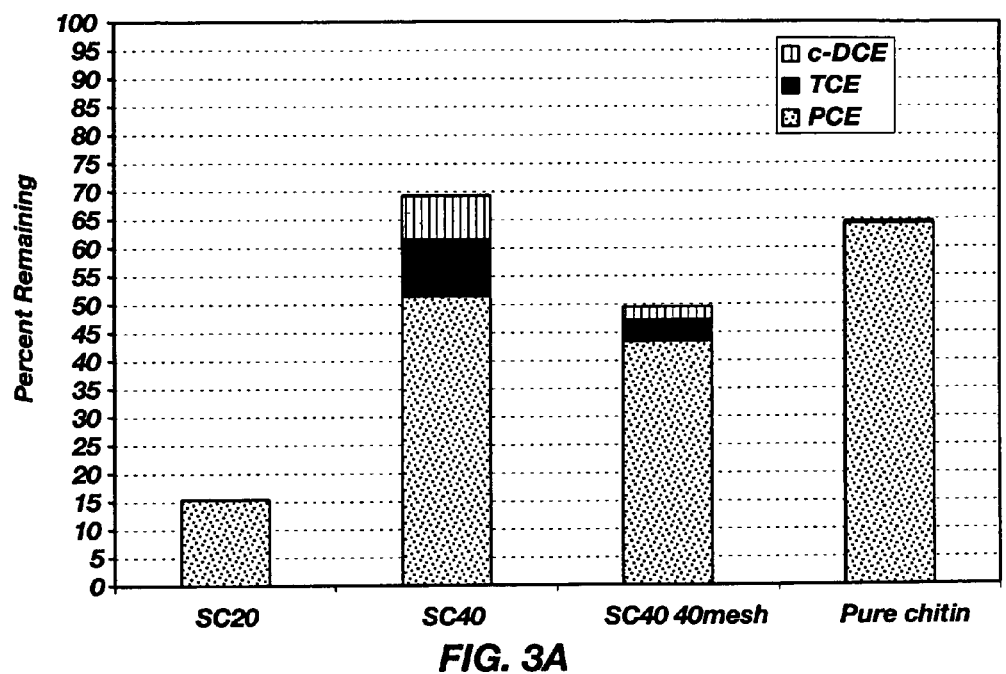
FIGS. 3A–B show the percent total chloroethene mass remaining in the microcosms of Example 3 as PCE, TCE, or c-DCE after four weeks of incubation.
Figure 3B:
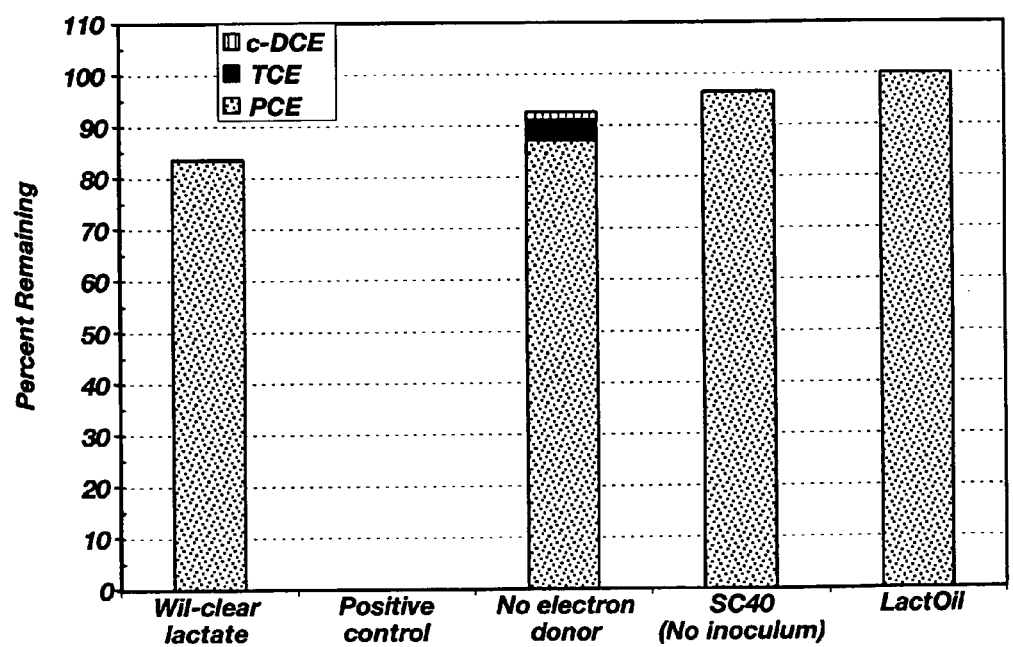
Figure 4A:
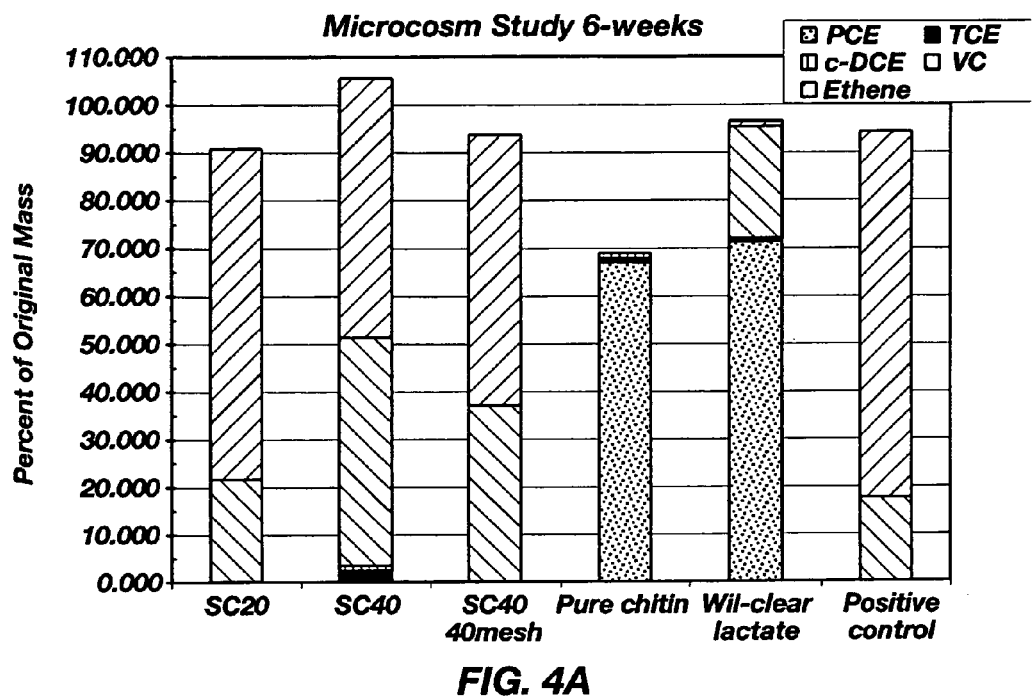
FIGS. 4A–B show the mass balances of chloroethenes and ethene in the microcosms of Example 3 after six weeks of incubation.
Figure 4B:
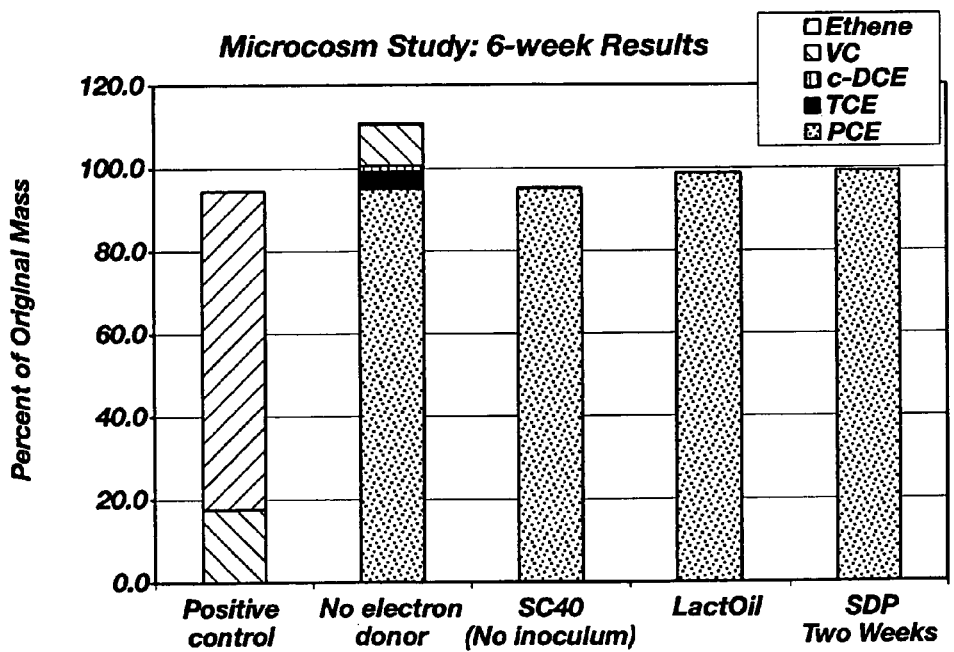
Figure 5A:
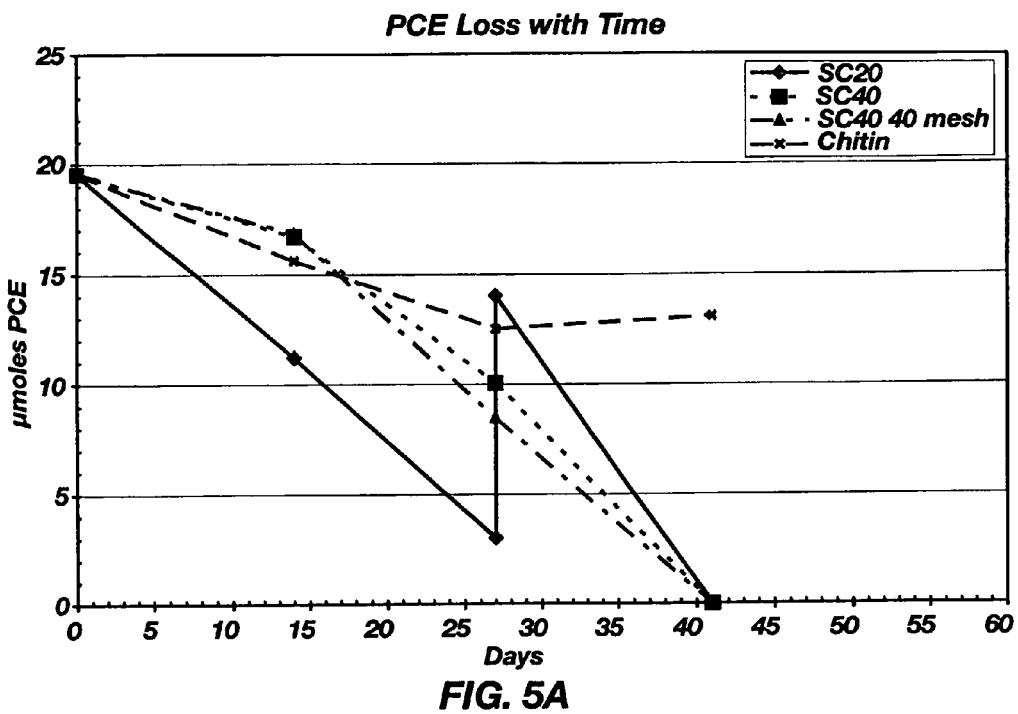
FIGS. 5A–B show the loss of PCE over time in the microcosms of Example 3.
Figure 5B:
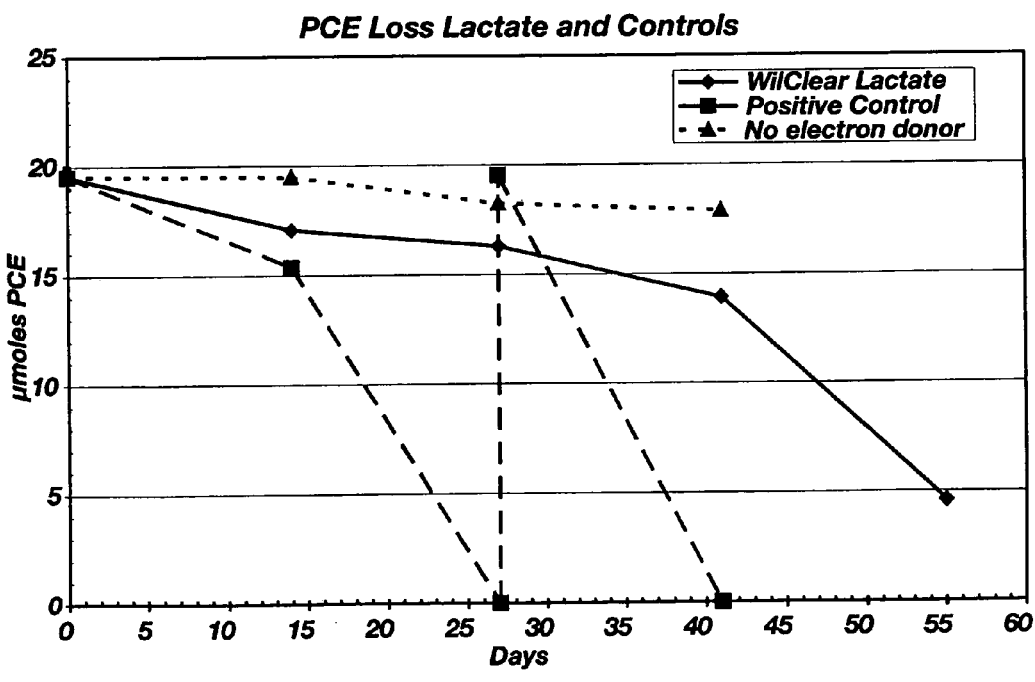
Figure 6:
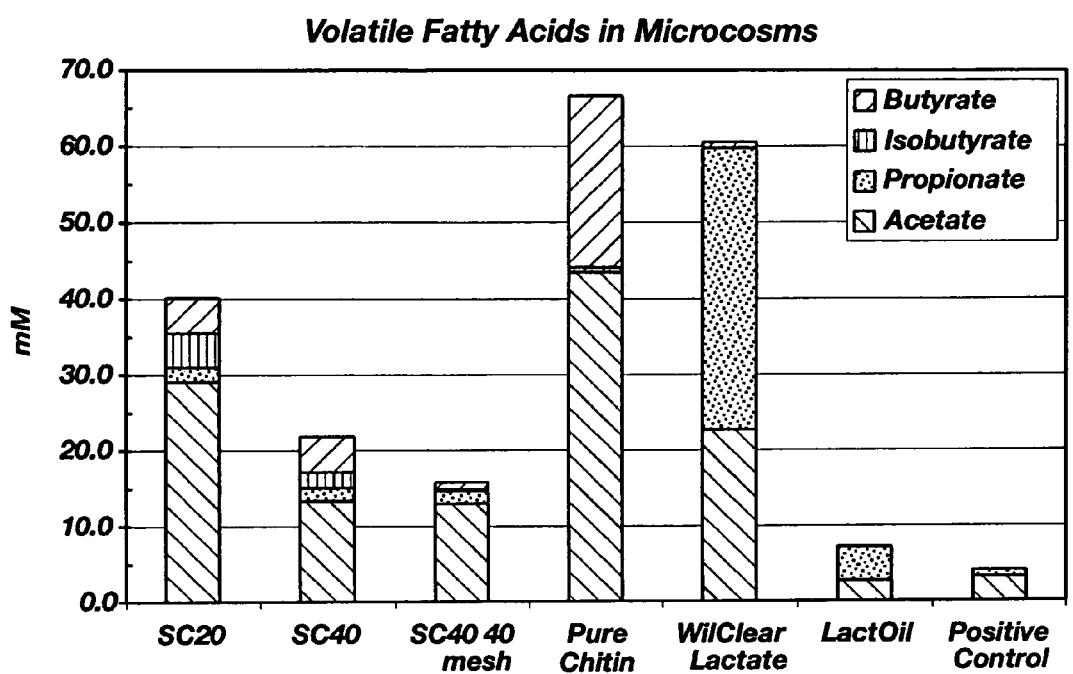
FIG. 6 shows the molar concentrations of volatile fatty acids (VFAs) in the microcosms of Example 3 after six weeks of incubation.
Figure 7A:
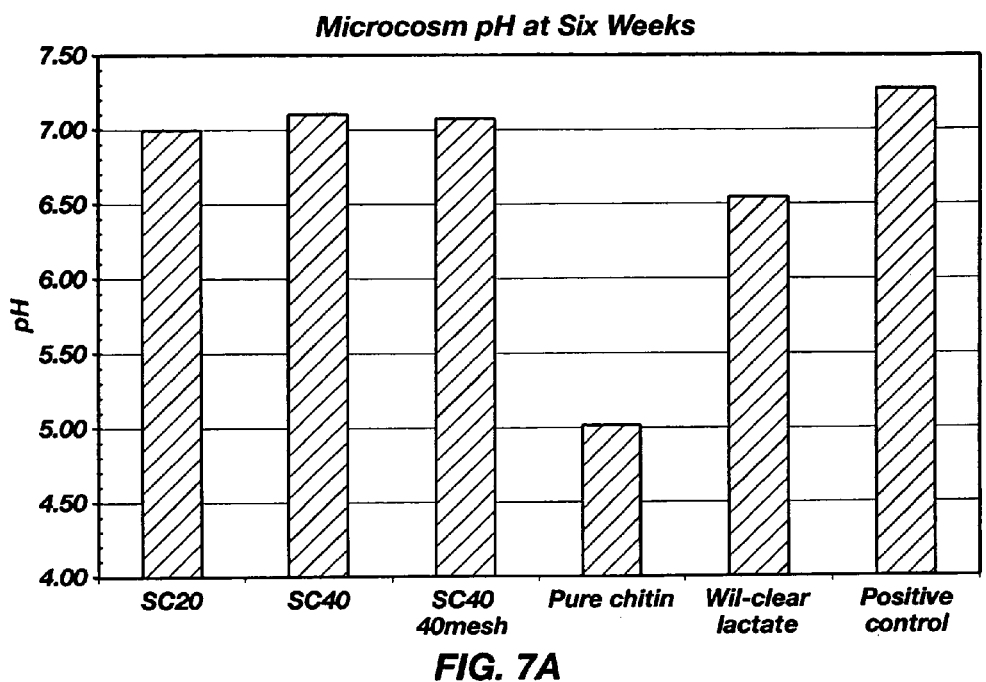
FIGS. 7A–B show pH (FIG. 7A) and methane concentration (FIG. 7B) data after six weeks of incubation in the microcosms of Example 3.
Figure 7B:
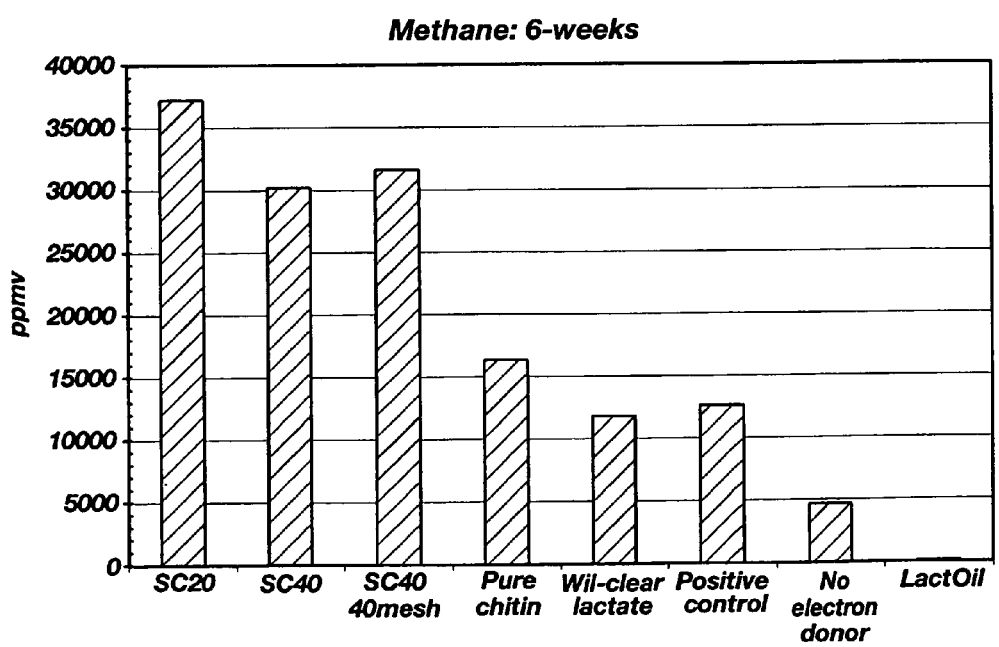
Figure 8:
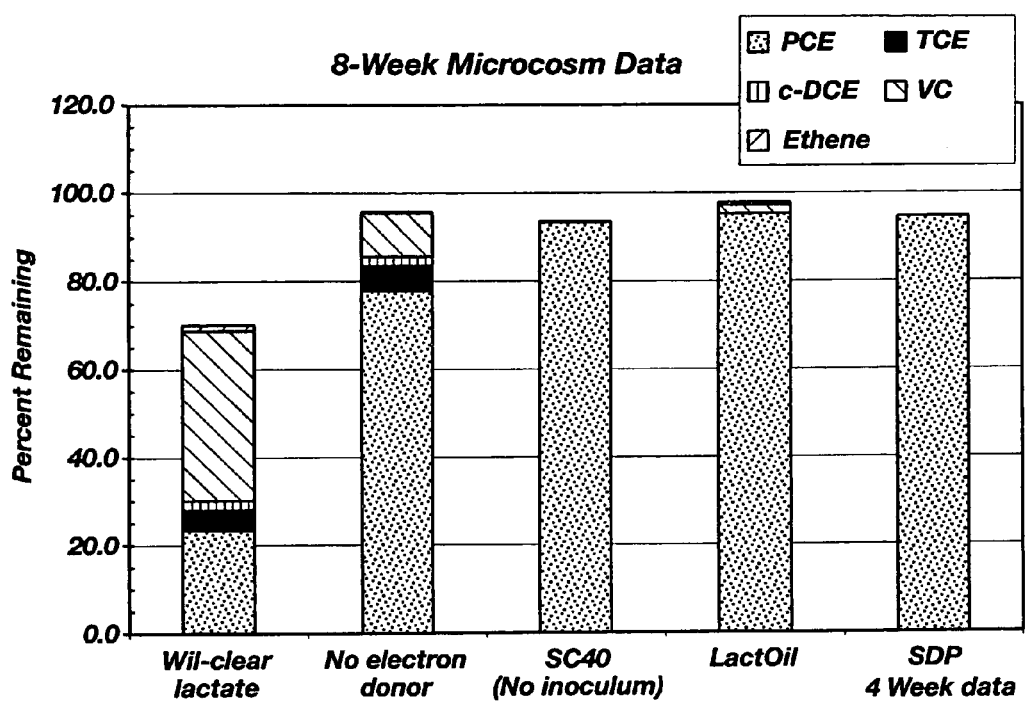
FIG. 8 shows the mass balance of chloroethenes and ethene in selected microcosms of Example 3 after eight and four weeks of incubation.

The experiment are summarized in FIGS. 1–8 and Tables 2 and 3.

TABLE 2

| Electron donor | Days | PCE | TCE | c-DCE | VC | Ethene | Methane |
|---|---|---|---|---|---|---|---|
| SC20 | 14 | 11.22 | 0.50 | 0.23 | nd | nd | nd |
|  | 27 | 3.01 | 0.00 | 0.00 | nd | nd | nd |
|  | 27 | 14.03 | 0.00 | 0.00 | nd | nd | nd |
|  | 41 | 0.01 | 0.00 | 0.00 | 4.50 | 23.97 | 37,208 |
| SC40 | 14 | 16.70 | 0.20 | 0.13 | nd | nd | nd |
|  | 27 | 10.07 | 1.32 | 1.48 | nd | nd | nd |
|  | 41 | 0.00 | 0.48 | 0.20 | 9.35 | 10.59 | 30,227 |
| SC40/40 | 14 | 16.83 | 0.94 | 0.46 | nd | nd | nd |
|  | 27 | 8.47 | 0.74 | 0.45 | nd | nd | nd |
|  | 41 | 0.00 | 0.00 | 0.00 | 7.26 | 11.07 | 31,592 |
| Pure Chitin | 14 | 15.61 | 0.06 | 0.01 | nd | nd | nd |
|  | 27 | 12.53 | 0.05 | 0.01 | nd | nd | nd |
|  | 41 | 13.08 | 0.06 | 0.00 | 0.10 | 0.04 | 16,347 |
| Wilclear Lactate | 14 | 17.07 | 0.15 | 0.10 | nd | nd | nd |
|  | 27 | 16.30 | 0.04 | 0.02 | nd | nd | nd |
|  | 41 | 13.92 | 0.09 | 0.06 | 4.55 | 0.22 | 11,811 |
|  | 55 | 4.59 | 0.87 | 0.43 | 7.55 | 0.25 | 5,242 |
| LactOil | 14 | nd | nd | nd | nd | nd | nd |
|  | 27 | nd | nd | nd | nd | nd | nd |
|  | 41 | nd | nd | nd | nd | nd | nd |
|  | 55 | nd | nd | nd | 0.37 | 0.13 | 59 |
| Positive Control | 14 | 15.36 | 1.76 | 1.01 | nd | nd | nd |
|  | 27 | 0.00 | 0.00 | 0.00 | nd | nd | nd |
|  | 27 | 19.54 | 0.00 | 0.00 | nd | nd | nd |
|  | 41 | 0.00 | 0.00 | 0.00 | 6.86 | 29.93 | 12,602 |
| No e⁻ donor | 14 | 19.49 | 0.00 | nd | nd | nd | nd |
|  | 27 | 18.25 | 0.05 | nd | nd | nd | nd |
|  | 41 | 17.89 | 0.31 | 0.18 | 1.93 | 0.04 | 4,683 |

TABLE 3

| Electron donor | Days | Acetate (mM) | Propionate (mM) | Iso-butyrate (mM) | Butyrate (mM) | pH |
|---|---|---|---|---|---|---|
| SC20 | 41 | 29.05 | 1.99 | 4.44 | 4.63 | 7.00 |
| SC40 | 41 | 13.33 | 1.80 | 2.06 | 4.71 | 7.10 |
| SC40/40 | 41 | 13.01 | 1.64 | 0.27 | 0.92 | 7.08 |
| Pure Chitin | 41 | 43.49 | 0.61 | 0.00 | 22.48 | 5.02 |
| Wilclear Lactate | 41 | 22.71 | 37.04 | 0.00 | 0.77 | 6.54 |
| LactOil | 41 | 2.70 | 4.51 | 0.00 | 0.00 | 6.32 |
| Positive Control | 41 | 3.25 | 0.83 | 0.00 | 0.00 | 7.27 |
| No e⁻ donor | nd | nd | nd | nd | nd | nd |

Of the chitin-containing products tested, SC20 performed the best. This is an unexpected and surprising result, because it was predicted that pure chitin and SC40, which have higher levels of chitin per unit mass, would be more effective electron donors for the dechlorinating bacteria. It was also predicted that SC40 would be a more effective electron donor than SC20, which was not borne out in this study. The reason that both SC20 and SC40 gave better results than pure chitin might be attributed to the higher protein contents of each as compared to pure chitin. The calcium carbonate is also believed to be a contributing factor, because it acts as a buffer to neutralize organic acids that are produced and keeps the system from generating a pH too low for optimal bacterial growth.

The reason pure chitin failed to promote dechlorination to the extent that was predicted might also be due to the extremely low pH generated (about pH 5.0). These acid conditions occurred even though limestone was added as a buffer to each microcosm. One reason that the pH in the pure chitin microcosms was so low compared to the SC20 and SC40 microcosms is that the chitin microcosms had a much higher loading of chitin. Another reason is that the SC20 and SC40 microcosms contained relatively large amounts of calcium carbonate, which buffered the acid produced in the SC20 and SC40 microcosms.

Wilclear™ lactate was slow at promoting dechlorination as compared to the chitin-containing products and the positive control. This is an interesting result because the positive control also received lactate as an electron donor, although at a much lower concentration. It is possible that the lactate concentration in the Wilclear™ lactate was too high. The 1% concentration was selected because it represented a possible field application condition, albeit at the high end. Another possible limitation in these microcosms is the lack of supplied vitamins, although the VFA data and methane analysis showed that considerable biological activity was present in these systems. The SC20 and SC40 microcosms contained trace nutrients supplied as constituents of the SC20 and SC40 products.

LactOil™ lactate ester at the 1% loading created a significant absorption sink for the PCE added to the system. Only 1% of the PCE was detected in the aqueous fraction of these microcosms and little activity was detected. After eight weeks, some VC and ethene were detected, however, the rates of dechlorination were clearly very slow. The VFA analysis showed that some fermentation occurred, so additional incubation time might be required. Of possible concern is the sequestration of essential nutrients in the oil emulsion and the possible adherence of the microbial cells themselves to the emulsion. If this effectively removed the cells from the aqueous phase, their metabolism might have been seriously impacted.

Microcosms without any added electron donor exhibited significant dechlorination activity. During the first six weeks, the activity observed exceeded the amount of dechlorination observed in the LactOil and pure chitin samples. This provides further evidence that there was something intrinsic to these microcosms that inhibited even the background dechlorination activity.

The invention claimed is:

1. A method for in situ bioremediation of a contaminant in ground water comprising adding to the ground water a composition comprising an electron donor in an amount sufficient for a microbe in the ground water to use the electron donor for reducing the contaminant into an innocuous derivative thereof, wherein the electron donor comprises about 10 to 30% by weight of chitin, about 5–50% by weight protein, about 20–60% by weight calcium carbonate, and about 10–20% by weight of water.

2. A method for in situ bioremediation of a contaminant in ground water comprising adding to the ground water a composition comprising an electron donor in an amount sufficient for a microbe in the ground water to use the electron donor for reducing the contaminant into an innocuous derivative thereof, wherein said electron donor comprises 30–50% by weight of chitin, about 1 to 5% by weight of protein, about 40–70% by weight of calcium carbonate, and about 10 to 20% by weight of water.

3. The method of claim 1 wherein the composition comprises crustacean shell.

4. The method of claim 1 wherein the composition is added to the ground water as a particulate solid.

5. The method of claim 1 wherein the composition is added to the ground water as a slurry or aqueous suspension.

6. The method of claim 5 wherein the slurry or aqueous suspension comprises at least about 100 milligrams per liter of chitin.

7. The method of claim 1 wherein the composition comprises ground mushrooms or a fungal fermentation broth.

8. The method of claim 1 wherein the contaminant comprises a halogenated hydrocarbon.

9. The method of claim 8 wherein the halogenated hydrocarbon comprises a chlorinated ethene, chlorinated ethane, chlorinated methane, straight-chain chlorinated hydrocarbon, or chlorinated aromatic.

10. The method of claim 1 wherein the contaminant comprises an explosive, a perchlorate, a halogenated organic compound, or a metal.

11. The method of claim 10 wherein the metal comprises copper, molybdenum, uranium, chromium, selenium, vanadium, arsenic, silver, antimony, cadmium, lead, mercury, thallium, tin, cobalt, iron, manganese, nickel, zinc, or mixtures thereof.

12. The method of claim 1 wherein the microbe carries out anaerobic reductive dehalogenation of the contaminant.

13. The method of claim 1 further comprising adding the microbe to the ground water.

14. The method of claim 2 wherein the composition comprises crustacean shell.

15. The method of claim 2 wherein the composition is added to the ground water as a particulate solid.

16. The method of claim 2 wherein the composition is added to the ground water as a slurry or aqueous suspension.

17. The method of claim 16 wherein the slurry or aqueous suspension comprises at least about 100 milligrams per liter of chitin.

18. The method of claim 2 wherein the composition comprises ground mushrooms or a fungal fermentation broth.

19. The method of claim 2 wherein the contaminant comprises a halogenated hydrocarbon.

20. The method of claim 19 wherein the halogenated hydrocarbon comprises a chlorinated ethene, chlorinated ethane, chlorinated methane, straight-chain chlorinated hydrocarbon, or chlorinated aromatic.

21. The method of claim 2 wherein the contaminant comprises an explosive, a perchlorate, a halogenated organic compound, or a metal.

22. The method of claim 21 wherein the metal comprises copper, molybdenum, uranium, chromium, selenium, vanadium, arsenic, silver, antimony, cadmium, lead, mercury, thallium, tin, cobalt, iron, manganese, nickel, zinc, or mixtures thereof.

23. The method of claim 2 wherein the microbe carries out anaerobic reductive dehalogenation of the contaminant.

24. The method of claim 2 further comprising adding the microbe to the ground water.

25. A method for in situ bioremediation of a contaminant in ground water, wherein the contaminant comprises an explosive or a perchlorate, comprising adding to the ground water a composition comprising an electron donor in an amount sufficient for a microbe in the ground water to use the electron donor for reducing the contaminant into an innocuous derivative thereof, wherein the electron donor comprises about 0.1 to 75% by weight of chitin.

26. The method of claim 25 wherein the composition comprises about 0.5 to 65% by weight of chit in.

27. The method of claim 25 wherein the composition comprises about 2 to 50% by weight of chitin.

28. The method of claim 25 wherein the composition comprises crustacean shell.

29. The method of claim 25 wherein the composition comprises a mixture comprising about 10 to 30% by weight of chitin, about 5–50% by weight protein, about 20–60% by weight calcium carbonate, and about 10–20% by weight of water.

30. The method of claim 25 wherein the composition comprises a mixture comprising about 30–50% by weight of chitin, about 1 to 5% by weight of protein, about 40–70% by weight of calcium carbonate, and about 10 to 20% by weight of water.

31. The method of claim 25 wherein the composition is added to the ground water as a particulate solid.

32. The method of claim 25 wherein the composition is added to the ground water as a slurry or aqueous suspension.

33. The method of claim 32 wherein the slurry or aqueous suspension comprises at least about 100 milligrams per liter of chitin.

34. The method of claim 25 wherein the contaminant further comprises a halogenated hydrocarbon.

35. The method of claim 34 wherein the halogenated hydrocarbon comprises a chlorinated ethene, chlorinated ethane, chlorinated methane, straight-chain chlorinated hydrocarbon, or chlorinated aromatic.

36. The method of claim 25 wherein the contaminant further comprises a halogenated organic compound.

37. The method of claim 25 wherein the contaminant further comprises a metal.

38. The method of claim 37 wherein the metal comprises copper, molybdenum, uranium, chromium, selenium, vanadium, arsenic, silver, antimony, cadmium, lead, mercury, thallium, tin, cobalt, iron, manganese, nickel, zinc, or mixtures thereof.

39. The method of claim 25 wherein the microbe carries out anaerobic reductive dehalogenation of the contaminant.

40. The method of claim 25 further comprising adding the microbe to the ground water.

* * * * *